United States Patent [19]

Stein

[11] 4,295,509
[45] Oct. 20, 1981

[54] EMERGENCY TRACK RING FOR PNEUMATIC VEHICLE TIRES

[75] Inventor: Hermann Stein, Wuppertal-Barmen, Fed. Rep. of Germany

[73] Assignee: Vorwerk & Sohn GmbH & Co. KG., Wuppertal-Barmen, Fed. Rep. of Germany

[21] Appl. No.: 97,414

[22] Filed: Nov. 26, 1979

[30] Foreign Application Priority Data

Nov. 27, 1978 [DE] Fed. Rep. of Germany ....... 2851187

[51] Int. Cl.$^3$ .............................................. B60C 17/04
[52] U.S. Cl. ............................. 152/158; 152/330 RF; 152/330 L; 152/339; 152/400
[58] Field of Search ................................ 152/151-153, 152/155, 157, 158, 330 RF, 330 L, 339-342, 366, 400-401

[56] References Cited

U.S. PATENT DOCUMENTS

| | | | |
|---|---|---|---|
| 3,872,907 | 3/1975 | Curtiss et al. | 152/158 |
| 4,054,168 | 10/1977 | Beers et al. | 152/330 L |
| 4,091,854 | 5/1978 | French et al. | 152/158 |

FOREIGN PATENT DOCUMENTS

| | | | |
|---|---|---|---|
| 2817394 | 11/1978 | Fed. Rep. of Germany | 152/157 |
| 7706663 | 12/1978 | Netherlands | 152/152 |

Primary Examiner—John E. Kittle
Assistant Examiner—Lois E. Boland
Attorney, Agent, or Firm—Schwartz, Jeffery, Schwaab, Mack, Blumenthal & Koch

[57] ABSTRACT

An emergency track ring for a tubeless pneumatic tire comprising a bottom reinforced flange for mounting the ring on such a tire rim. At least one opening is formed in the ring to permit air to be admitted to the interior of the tire. Groove means are formed in the ring for filling with a lubricating material, and sealing lips close the groove means and seal the lubricant therein when the tire is mounted on said rim and under pressure. Flange means are integrally formed with the sealing lips and extend upwardly for engagement by the inside of the tire cover during loss of air, the depressing of the flange means effecting a lever action which causes the sealing lips to move so as to open the grooves and permit and lubricating material to be released to reduce friction between the tire cover and the track ring.

10 Claims, 4 Drawing Figures

U.S. Patent Oct. 20, 1981 Sheet 2 of 3 4,295,509
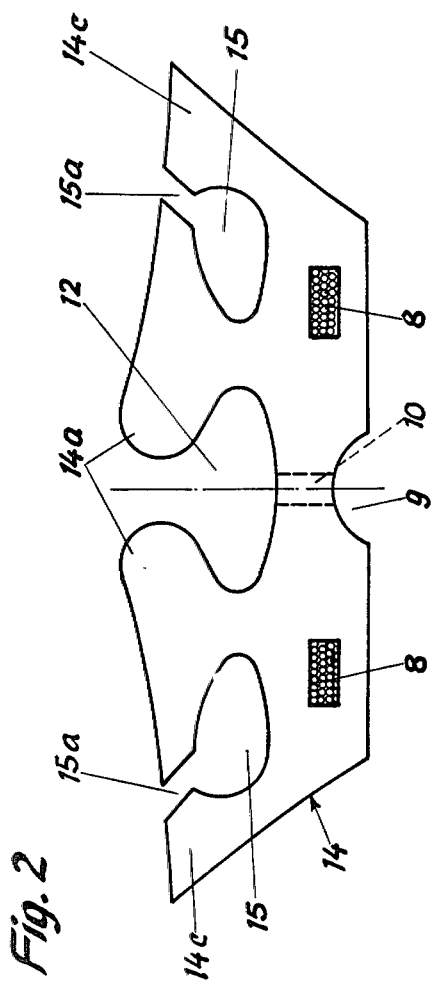
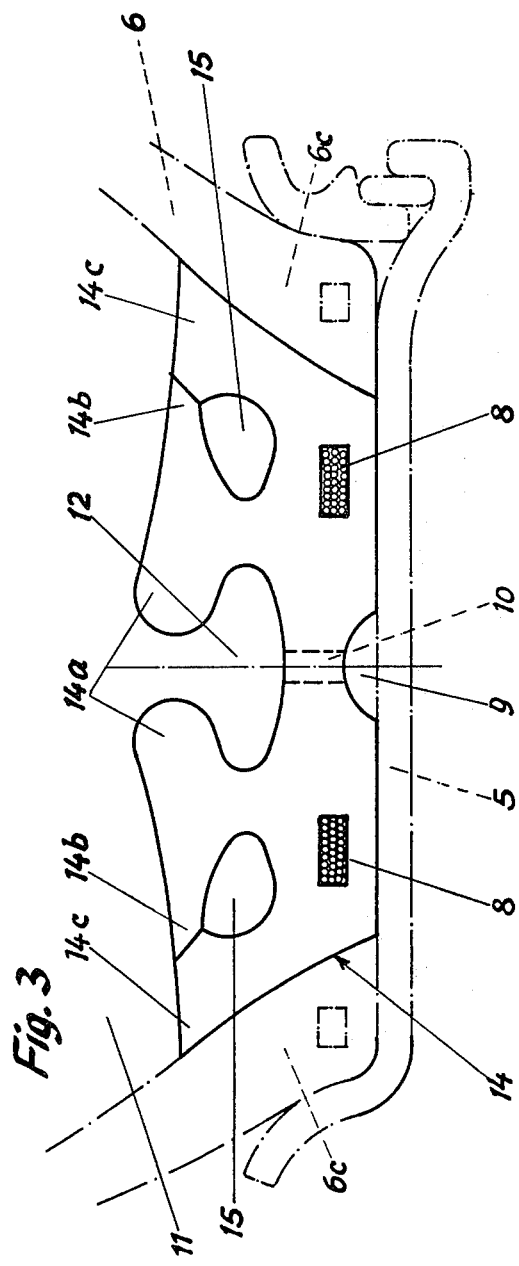

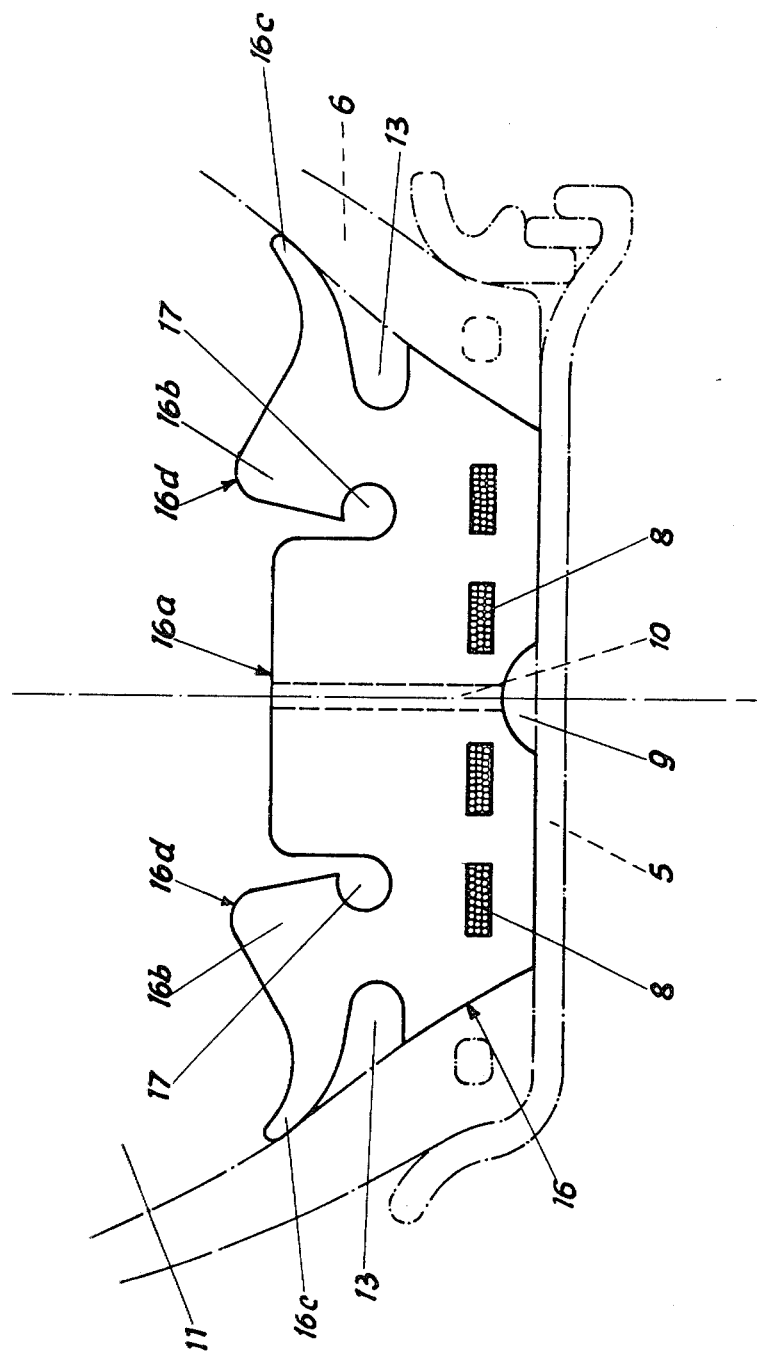

EMERGENCY TRACK RING FOR PNEUMATIC VEHICLE TIRES

BACKGROUND OF THE INVENTION

The invention relates to an emergency track ring for tubeless pneumatic tires adapted to be mounted on flat bed rims for commercial vehicles.

Pneumatic tires may be damaged by external objects or effects to the extent that they suddenly lose their air. In the process, the flange of the tire loses its solid seat and its seated position on the rim, with the result that the vehicle is essentially deprived of its directional stability of steerability. In such cases, continued travel produces strong friction because of the settling of the internal side of the tire cover onto the rim and eventually leads to the complete destruction of the faulty tire after a short distance. In order to enable the use of the defective tire over an appreciable distance until it may be replaced, the above mentioned emergency track rings serve to hold the tire flange in position and to support the flange against the tire deprived of its air.

Emergency track rings consisting of a rubber ring in the form of a hollow chamber tire in which the inner space of the tire is filled completely or partially are known. These emergency track rings have not found acceptance in practice because they result in an excessive total weight of the tire and/or are very difficult to mount. Furthermore, tires filled completely or partially with emergency track rings lose the optimum spring action for which pneumatic tires are known, or else, in the case of loss of air and deformation of the tire, friction still remains between the emergency track ring and the internal surface of the tire cover too great to permit the continued travel of the vehicle.

SUMMARY OF THE INVENTION

It is the object of the present invention to maintain a vehicle in an operable state after the total loss of air in the tire, by releasing a lubricant stored in the emergency track ring which substantially reduces the friction between the emergency track ring and the tire, over a reasonable distance.

The object is attained by means of a ring made of rubber or another elastomer, equipped with circumferential grooves sealable by means of sealing lips and containing lubricants. The grooves in the mounted state of the ring are sealed by axial prestressing and the pressure of the air in the tire, and are opened only in the case of the loss of air and the resulting pressure of the tire cover on the emergency track ring, by a lever action to release the lubricant for the purpose of reducing friction.

In two examples of embodiments of the invention, the emergency track ring is designed so that it rises slightly toward the center and is provided with a centrally located, circumferential relief cut recess, with the overhanging parts of said recess serving as a lever force arm and the lateral extensions thereof serving as the sealing lip for the grooves filled with the lubricant and acting as the load arm of the lever. With one ring of this type, the grooves filled with the lubricant are arranged at the outer sides of the ring, with the sealing lip resting against the inner side of the tire. In the second ring of this type the grooves are arranged between the outer side of the emergency track ring and the central, circumferential recess, whereby the sealing lips close lubricant outlet channels leading from the grooves into the inner space of the tire, by means of the lateral prestress generated during the mounting of the tire.

In a further embodiment of the ring, applicable primarily to tires with an extremely wide tire flange, two circumferential, backed-off recesses are provided, whereby their overhanging parts, as in the abovedescribed examples, are designed to form the force arm of the lever. Their lateral extensions again serve as the sealing lips for the grooves carrying the lubricant and also form the load arm of the lever.

Further characteristics and advantageous embodiments of the emergency track ring according to the invention will be explained hereinbelow when particular reference is made to the application drawings.

BRIEF DESCRIPTION OF THE APPLICATION DRAWINGS

FIG. 2 is a further embodiment of the emergency track ring, in an unmounted state;

FIG. 3 shows the emergency track ring of FIG. 2 mounted in a tire and rim, which are shown in dashed lines, and FIG. 4 shows a third embodiment of the emergency track ring mounted in a tire and rim, which are shown in dashed lines.

DETAILED DESCRIPTION OF THE PREFERRED EMBODIMENTS

Figure 1:
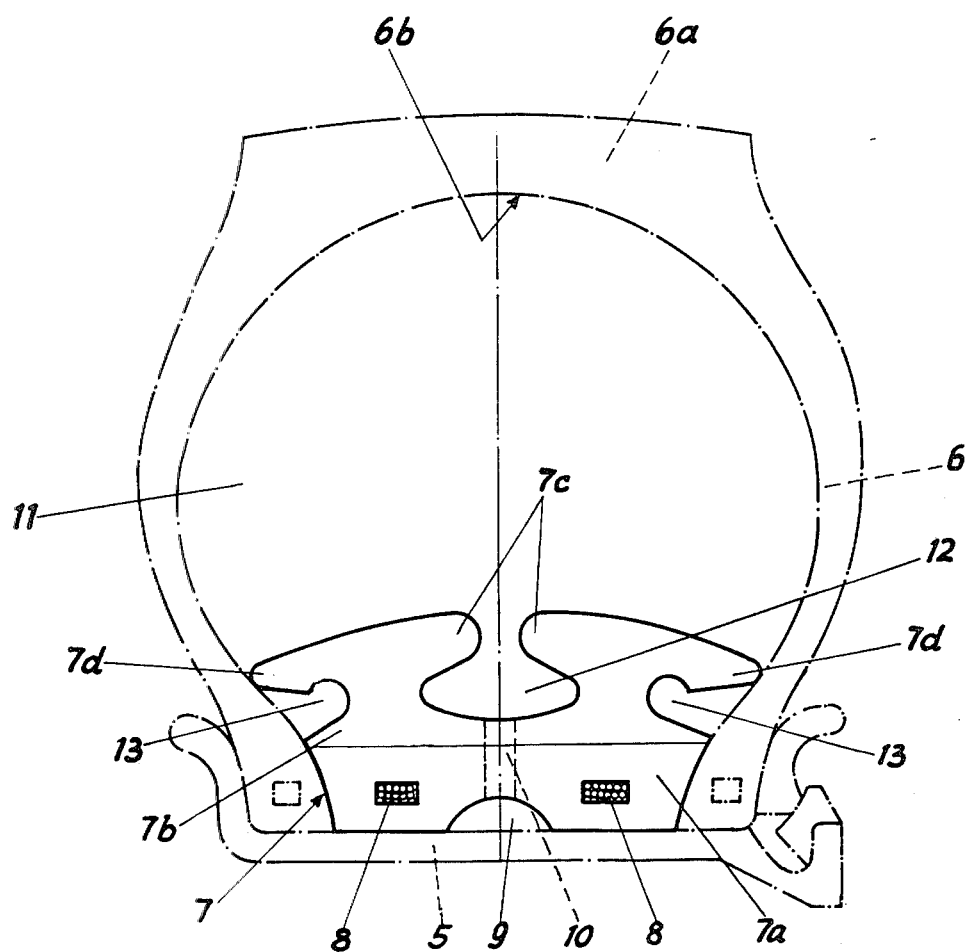
FIG. 1 shows one embodiment of an emergency track ring, mounted in a pneumatic tire and rim, which are shown in dashed lines.

Reference is now made to the application drawings, wherein like parts are indicated by like reference numerals.

The emergency track ring embodiments of FIGS. 1, 2-3 and 4 are generally indicated at 7, 14 and 16, respectively. Each ring embodiment is shown installed in a tubeless pneumatic tire 6 mounted on a flat bed rim 5. Each track ring is preferably made of rubber or other types of elastomeric material, and has a plurality of circumferential recesses, the purpose of which will be explained below. The bottom portion or flange (flange 7a in FIG. 1, for example) of each track ring is reinforced by two or more bundles of steel wire 8, which provide a solid seating of the ring on the rim 5.

Referring to the form of the invention shown in FIG. 1, the emergency track ring 7 includes the bottom flange 7a above referred to and a top part 7b. The flange 7a may, if desired, be formed of an elastomeric material that is harder than the material which forms the upper part 7b, in order to enhance the seating of the flange 7a on the rim 5. A circumferential recess 9 is formed in the bottom wall of the ring flange 7a, and a plurality of passages or channels 10 interconnect the recess 9 with the recess 12 formed in the ring, and thus with the interior 11 of the tire. The recess 9 and passages 10 provide for the passage of air into the tire from the tire valve.

The upper part 7b of the ring is formed with overhanging flanges 7c which are shaped to define a centrally arranged, circumferential recess 12 which resembles in its outline an inverted mushroom. It will be noted that the flanges 7c rise slightly toward the center of the ring, with the outer extensions at the sides of the flanges 7c forming sealing lips 7d, with the lips being shown in FIG. 1 bearing against the inner side walls of the tire.

The sealing lips 7d define with their bottom surfaces a groove 13 formed in the upper part 7b of the ring, with each groove being closed toward the center of the ring and open at the outer end thereof. Both grooves 13 are filled prior to mounting of the ring with a lubricant of paste-like to waxy consistency. When air is pumped into the tire after the tire is mounted on the rim, the air pressure firmly presses the sealing lips 7d against the inner wall of the tire thereby preventing the escape of the lubricant. When the tire loses air due to external forces or action of the tire, the inner wall 6b of the tire cover 6a descends downwardly into engagement with the flanges 7c of the track ring thereby pressing the same into the recess 12. As a result, a lever effect is exerted on the sealing lips 7d thereby raising the lips and releasing the lubricant, which liquifies at operating temperatures of the tire in excess of 40° C., with the lubricant serving to reduce the friction generated between the inner wall 6b of the tire cover and the surface of the track ring 7.

Referring to the track ring embodiment shown in FIGS. 2 and 3, this form of the invention similarly provides grooves filled with a lubricant which is released upon tire failure. The track ring 14 is shown unmounted in FIG. 2, and contains a recess 9, passages 10, and central opening 12 similar to the embodiment of FIG. 1. Overhanging flanges 14a are likewise provided, the outer ends of which are spaced from the edge zones 14c of the ring 14 to form channels 15a which communicate with grooves or recesses 15 formed in the ring. The grooves 15 are filled with lubricant similarly to the grooves 13 of the FIG. 1 form, and when the track ring 14 is inserted into the tire, the ring is prestressed due to force exerted by the inner sides of the tires on the edge zones 14c of the ring generally at the heighth of the tire bead 6c. Such prestressing acts to close the lubricant outlet channels 15a, as shown in FIG. 3. Upon the loss of air in the tire, the inner side of the tire cover presses on the overhanging flanges 14a. When the uppermost areas of the flanges are forced downwardly, the lever action previously described results in the sealing lips 14b being raised upwardly to reform the channels 15a through which the lubricant can exit for the same purpose of reducing friction between the inner wall of the tire cover and the surface of the track ring.

The embodiment of FIG. 4, to which reference is now made, is specifically designed for use with tires having very broad rims while maintaining the important feature of the invention comprising the release of lubricant consequent to tire failure. Structure previously illustrated and described has been identified in FIG. 4 by the same reference numerals.

In the FIG. 4 form, overhanging flanges 16b are similarly provided, but are spaced by a thick, central portion 16a the top of which is generally horizontal and positioned below the upper edges 16d of the overhanging flanges 16b. Before the track ring is installed, the grooves 13 are filled with lubricant as previously described in connection with the FIG. 1 embodiment, and when the track ring is installed as shown in FIG. 4 the sealing lips 16c engage the adjacent wall of the tire 6 to confine the lubricant in the grooves 13 when the tire is under pressure. The bottom of the inner edges of the overhanging flanges 16b extend downwardly and are spaced from the adjacent side walls of the central portion 16a of the ring, and recesses 17 are formed in the ring below the flanges 16b and radially inwardly of the grooves 13. The recesses 17 are formed on either side of the longitudinal center of the track ring, which is shown in dashed lines in FIG. 4. When the flanges 16b are engaged by the tire cover and forced downwardly consequent to tire failure, the inner edges of the flanges 16b extend into the recesses 17 thereby resulting in the described lever effect which raises the sealing lips 16c to release the lubricant for the purpose described.

The lubricant preferably comprises substances which have no swelling or other damaging affect on the elastomeric material, with polyglycols or salts of fatty acids being examples of lubricants which can be satisfactorily used.

I claim:

1. An emergency track ring for a tubeless pneumatic tire adapted to be mounted on a tire rim, comprising
   (a) a bottom reinforced flange for mounting the ring on such rim,
   (b) at least one opening in said ring to permit air to be admitted to the interior of the tire,
   (c) groove means formed in said ring adapted to be filled with a lubricating material,
   (d) sealing lips closing said groove means and sealing said lubricant therein when said tire is mounted on said rim and under pressure,
   flange means integrally formed with said sealing lips and extending radially upwardly with respect to said sealing lips for engagement by the inside of the tire cover during loss of air,
   said sealing lips and flange means being formed and arranged such that when said flange means are depressed, lever action causes said sealing lips to move so as to open said grooves and permit said lubricating material to be released to reduce friction between said tire cover and said track ring.

2. The emergency track ring of claim 1 wherein said groove means are formed in the side walls of said ring just below said sealing lips, said sealing lips engaging the adjacent wall of the tire, and further including a central recess immediately below the radially inner edges of said flange means, the latter being forced into said central recess when engaged by the inside of said tire cover, and the sealing lips, through lever action, being consequently raised from engagement with the adjacent wall of said tire thereby to open said grooves and permit release of said lubricant.

3. The track ring of claims 1 or 2 wherein a circumferential recess is formed in the bottom of said reinforced flange, and a plurality of axially extending passages interconnects said circumferential recess with the interior of said tire so as to permit air pressurization of the same.

4. The track ring of claim 1 wherein said ring is formed with edge zones which contact the adjacent wall of said tire, said edge zones when said ring is not under pressure being spaced from said sealing lips so as to form channels, said groove means comprising grooves communicating with said channels, said channels when said ring is mounted and said tire pressurized being closed so as to confine and seal the lubricating material in said grooves, the engagement of said flange means by the inside of the tire cover causing, through lever action, said sealing lips to move away from said edge zones of said ring so as to reform said channels and permit release of said lubricating material.

5. The track ring of claim 4 wherein said flange means are two in number and spaced from each other centrally of the ring, said ring being formed with a central recess below the inner edges of said flange means into which said flange means can be depressed thereby resulting in raised movement of said sealing lips to reform said channels.

6. The emergency track ring of claim 1 wherein said groove means comprise grooves formed in the sides of said ring, said sealing lips engaging the adjacent side wall of the tire and confining the lubricating material within said grooves when the tire is under pressure, and further including a relatively thick central portion which substantially separates said flange means, a recess at the juncture of each of said flange means and said central portion, whereby said flange means when depressed extends into said recesses thereby permitting said lever action to raise said sealing lips away from the walls of said tire to open said grooves and release said lubricating material.

7. The track ring of claim 6 wherein said central portion of said ring is generally horizontal and is positioned lower than the upper edges of said flange means so as not to be engaged by the inside of the tire cover consequent to the loss of air.

8. The emergency track ring of claim 1 wherein said bottom reinforced flange of said ring is formed of a relatively hard elastomeric material relative to the upper part of said ring which includes said sealing lips and said flange means.

9. The emergency track ring of claim 8 wherein said bottom flange is reinforced by means of steel wire means.

10. The track ring of claim 1 wherein said flange means rise slightly toward the center of said ring, with a central recess being formed below the inner, spaced edges of said flange means, said flange means comprising the force arm of a lever, with said flange means extending radially outwardly to form lateral extensions which comprise said sealing lips.

* * * * *